Aug. 7, 1951  D. R. HERRIOTT  2,563,168
SAFETY DEVICE FOR FLUID BRAKES
Filed Sept. 10, 1948  2 Sheets-Sheet 1
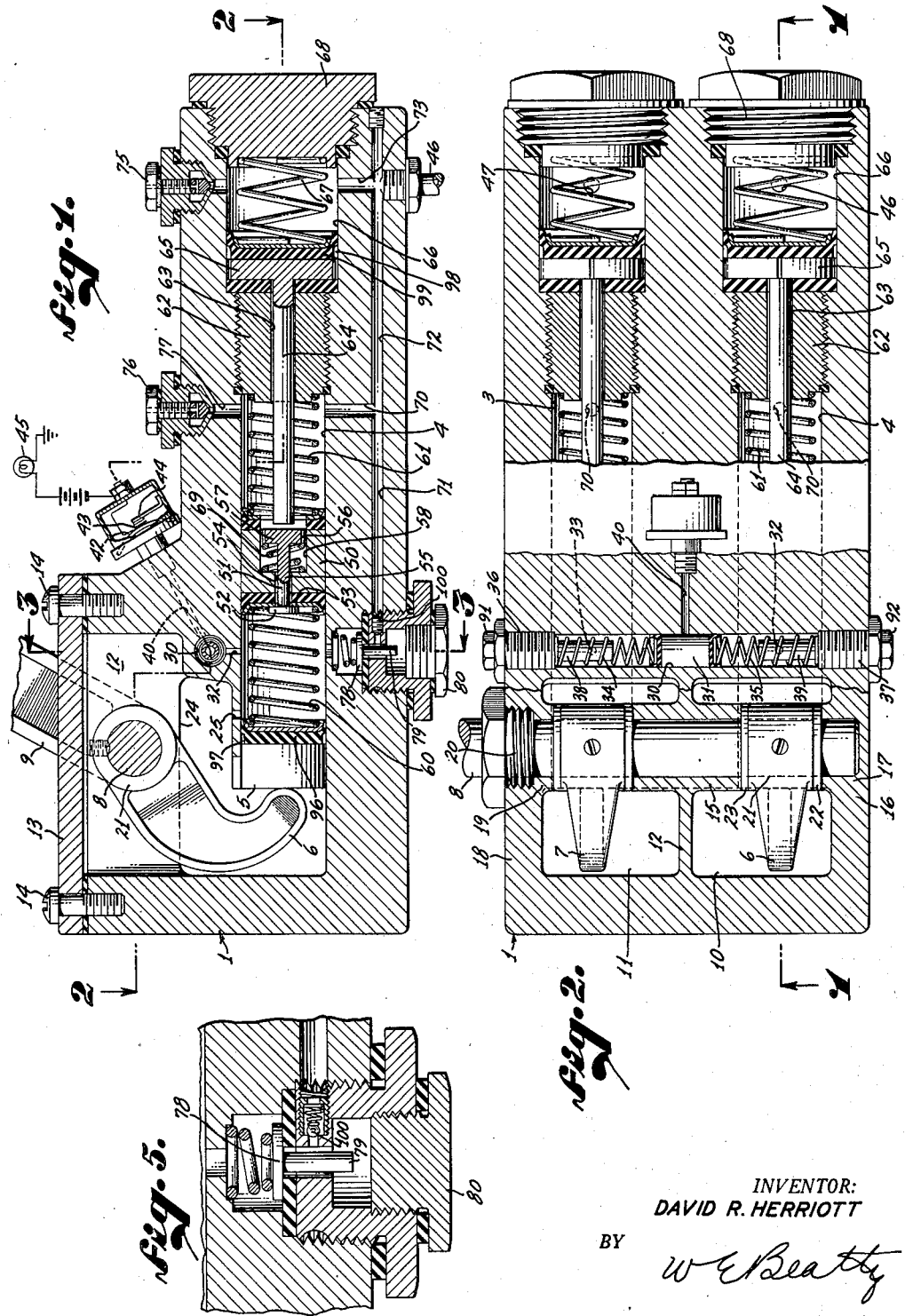
INVENTOR:
DAVID R. HERRIOTT
BY
W. E. Beatty
ATTORNEY.

Aug. 7, 1951
D. R. HERRIOTT
2,563,168
SAFETY DEVICE FOR FLUID BRAKES
Filed Sept. 10, 1948
2 Sheets-Sheet 2
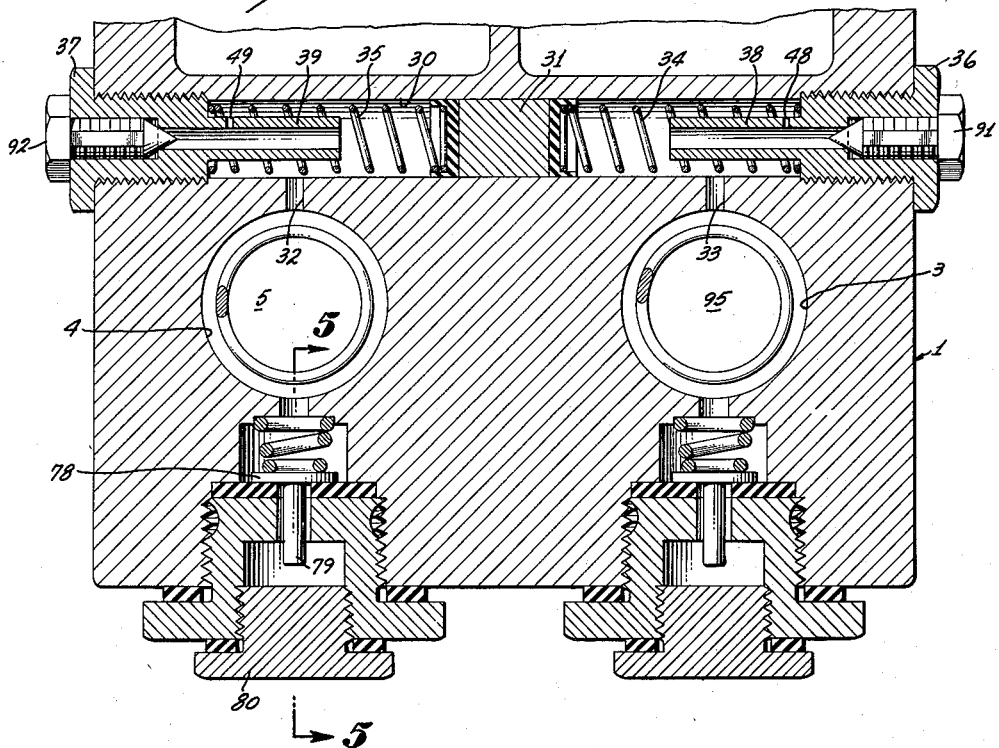
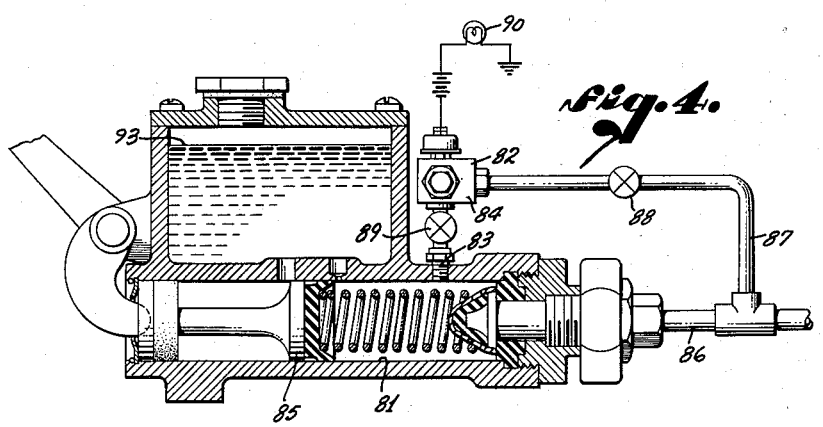
INVENTOR:
DAVID R. HERRIOTT
BY W. E. Beatty
ATTORNEY.

Patented Aug. 7, 1951

2,563,168

UNITED STATES PATENT OFFICE 2,563,168

SAFETY DEVICE FOR FLUID BRAKES

David R. Herriott, Glendale, Calif.

Application September 10, 1948, Serial No. 48,639

6 Claims. (Cl. 60—54.5)

The invention relates to a safety device for fluid brakes for automobiles or the like.

An object of the invention is to provide a normal braking application for four wheels under normal operating conditions and to provide at least a full two-wheel braking power in the event of a failure in the hydraulic system. This is accomplished by providing separate master cylinders for the front wheel brakes and for the rear wheel brakes, the assumption being that, if there is a failure, it will occur in one of the master cylinders or its brake line and not in the other.

A further object of the invention is to automatically shut off the flow of braking fluid in the brake line which has failed.

Another object of the invention is to provide a signal which will warn the driver of the vehicle on failure of one of the master cylinders or its brake line, or low fluid level in one of the master cylinders.

Another object of the invention is to equalize the fluid pressure in the two master cylinders for normal operation.

For further details of the invention, reference may be made to the drawings wherein Fig. 1 is a vertical sectional view through one side of the safety device, the section being taken on line 1—1 of Fig. 2.

Fig. 2 is a horizontal sectional view on the broken line 2—2 of Fig. 1.

The views in Figs. 1 and 2 are in the direction of the arrows on their respective lines.

Fig. 3 is an enlarged vertical cross sectional view on line 3—3 of Fig. 1 looking in the direction of the arrows.

Fig. 4 is a vertical sectional view through one side of a modified form of safety device.

Fig. 5 is an enlarged sectional view on line 5—5 of Fig. 3 with parts broken away.

Referring in detail to the drawings, the casing 1 corresponds to the well known master cylinder, but in this case has a pair of parallel cylinders 3 and 4. The inner ends of the cylinders 3 and 4 have the usual pistons as indicated at 95 and 5, respectively. The piston 5 is operated by brake lever 6 and the similar piston 95 is operated by a similar brake lever 7, the levers 6 and 7 operating at the same time and being mounted on a cross shaft 8 having the usual mechanical linkage 9 with a brake pedal not shown.

Casing 1 has a well 10 for brake fluid for the cylinder 4, and a well 11 for the other cylinder 3. The wells 10 and 11 are divided by a vertical partition 12. The wells 10 and 11 have a cover 13 removably secured by screws like 14 on the top of the casing 1. The partition 12 has a bearing 15 for the intermediate portion of the shaft 8. The wall 16 of the casing provides a step bearing 17 for the end of shaft 8, the other wall 18 has a bearing 19 and a screw sleeve 20 for the shaft 8. The lever 6 has a hub 21 and washers 22 and 23 which fit between the bearings 15 and 17 and the lever 7 is similarly arranged.

The top 24 of partition 12 is below the bearing 15. The fluid in well 10 communicates with the cylinder 4 by means of the usual port 25 in front of piston 5 when in retracted position, this port being closed when piston 5 is urged forwardly to trap brake fluid in front of this piston and build up fluid pressure for the brakes.

Casing 1 is preferably a one piece casting. Above and transversely of the cylinders 3 and 4 is a through bore 30 serving as a cylinder for the equalizing piston 31. Bore 30 is below the fluid level in casing 1.

The casing 1 has a passage 32 which communicates the fluid pressure in cylinder 4 in front of main piston 5 with one side of the piston 31. The fluid pressure in cylinder 3 in front of main piston 95 is admitted to the other side of piston 31 by a passage 33. Piston 31 is urged to its mean position shown in Fig. 3 by the opposed and equal compression springs 34 and 35 which bear at their outer ends on screw plugs 36 and 37, respectively. Plug 36 has a reduced hollow extension 38 which serves as a stop for the one end of piston 31 and the plug 37 has a similar reduced extension 39 which serves as a stop for the other end of piston 31. Extensions 38, 39 have vents 48, 49.

When piston 31 is in its mean position shown in Fig. 2, it is centered with respect to a passage 40 which extends through the casing 1 and communicates with a diaphragm 42 which carries an electrical contact 43. Piston 31 is elongated as shown in Fig. 2 so as to allow the pressure in cylinders 3 and 4 to equalize even though one of them is connected with a brake line such as the front brakes using a larger volume of brake fluid than the rear wheel brakes. If a failure occurs in one of the brake lines 46 or 47, however, the pressure on one side of piston 31 will be reduced to such an extent that it will move to one of the stops 38 or 39 and open the passage 40, thereby actuating the diaphragm 42 and closing contacts 43 and 44 to operate a signal lamp 45 or other alarm, to indicate failure of one of the brake lines. The brake line for cylinder 4 is indicated at 46 and the brake line for cylinder 3 is indicated at 47. The alarm 45 will also be actuated if there is a failure in the brake system anywhere on the compression side of the pistons 5 or 95.

In order for the alarm system to function when the fluid level becomes alarmingly low in either fluid reservoir, it is necessary that the top of the auxiliary cylinder 30 be at the exact level of a predetermined dangerous low level mark. It can readily be seen that if the fluid level in either reservoir should fall below this mark, that an air bubble will form on the side of piston 31 where the low level exists. Upon application of the brake pedal the piston 31 will be forced toward the side having the air bubble, because the air bubble will compress, thereby opening alarm passage 40 and causing the alarm circuit to be closed. It can also be seen that in the event of failure of the cup washer on either side of piston 31, the alarm system would also function. Any foreseen trouble that could happen to the hydraulic system will cause the alarm system to operate.

If there is a failure in either one of the brake lines 46 or 47 or in either master cylinder, the flow of brake fluid is nevertheless automatically shut off as follows. Cylinders 3 and 4 are portions of elongated similar parallel bores in the casing 1 and both are provided with similar automatic shut-off mechanisms, one of which will be described in connection with cylinder 4. Cylinder 4 is somewhat elongated and at its center has a sliding piston 50 in which is mounted a coaxial reciprocating valve 51 having a head 52 which closes on a seat 53 and, when open, permits fluid in front of piston 50 to flow around head 52 through the bore 54 around the stem 55 and through grooves 56 in the periphery of the stem guide 57 which slides in the bore 58 in the piston 50. In the absence of fluid pressure on either side of piston 50, it assumes a mean position in cylinder 4 as it is acted on by the equal and opposing compression springs 60 and 61. The outer end of the cylinder 4 is closed by a screw plug 62 having a bore 63 therein to loosely support and guide the elongated stem 64 on a piston 65 which slides in an enlarged cylinder 66. Piston 65 has a cup rubber washer 99 like the usual master piston washer 96 in having spaced grooves 97, 98 to allow fluid flow towards the rim but not in the reverse direction. Piston 65 is urged to the left against the right end of plug 62 by a spring 67. The outer end of cylinder 66 is closed by a screw plug 68. Valve 51 is urged to closed position by a spring 69.

Springs 60 and 61 acting on the piston 50 have the same force which is a few pounds less than the brake return spring. Spring 69 acting on valve 51 has a force which is a few pounds less than that of the springs 60 and 61. Spring 67 has a force less than that of the spring 69 and just sufficient to urge piston 65 to the left to the position shown in Fig. 1. Cylinder 4 at a point in advance of plug 62 has a passage 70 which communicates with a bleed passage 71 and also with an outlet passage 72 which leads to the brake line 46 and by way of passage 73 to the cylinder 66.

If there is no break in the line 46 and for normal operation, on stepping on the brake pedal, the levers 6 and 7 advance pistons 5 and 95 to close ports like 25 and build up pressure in cylinders 3 and 4 at the left of pistons like 50. If equal pressures are built up in cylinders 3 and 4, the equalizer piston 31 is acted on differentially by such equal pressures and it remains in its mean position closing passage 40 so that the alarm 45 is not operated. Also if one of the pair of brakes takes more brake fluid than the other for normal operation, piston 31 will drift in the direction of the brake line taking the larger volume, but without opening passage 40, as piston 31 is elongated.

Also during normal operation, with pressure built up in front of piston 5, piston 50 advances to the right to build up pressure in passage 70 in brake line 46 and in cylinder 66 to add to the force of spring 67 and hold the stem extension 64 in position shown against the action of spring 69 and hydraulic pressure on valve 51 whereby the stem extension 64 contacts the stem guide 57 to open valve 51 and allow the pressure fluid in front of piston 5 to flow past valve 51 directly into passages 70 and 72 to the brake line 46. When the brakes connected to the brake line 46 are released by releasing the brake pedal, the springs 60 and 61 return piston 50 to its mean position shown in Fig. 1 and spring 69 closes valve 51, because spring 69 is weaker than spring 60 and 61, and, therefore, weaker than the brake shoe return springs any excess fluid pressure in passages 46, 72 and 70 will be relieved through valve head 52 when piston 50 arrives at its mean position. The corresponding parts in cylinder 3 operate similarly.

If there is a failure in the brake line 46, there will be no fluid pressure built up in brake line 46 or in cylinder 66 on applying the brakes, with the result that fluid pressure and the spring 69 which holds valve 51 closed overpowers spring 67 and pushes the stem extension 64 outwardly without opening valve 51, thereby preventing loss of brake fluid. The failure to build up fluid pressure in front of piston 5, when pressure is built up in front of the piston 95, results in the equalizer piston 31 drifting until it strikes the stop 39, thereby opening the passage 40 and operating the alarm 45 so that the operator will know of such failure. Even so, with the brake line 47 operative, the car can still be handled safely as the brakes for one pair of wheels, either front or rear, whichever is connected to line 47, remain operative even though the brakes for the other wheels are not operative due to a failure of the brake line 46.

Cylinder 66 and cylinder 4 are provided with suitable bleeder valves 75 and 76 respectively. Bleeder valve 76 has a passage 77 to bleed the space between piston 50 and plug 62. Also a bleeder valve 78 is provided to bleed the brake system. Valve 78 has a stem 79 which may be actuated when the cap 80 is removed. Removal of cap 80 does not bleed the passage 71 and its connecting passages as well as the brake line 46, due to check valve 100. Bleeder valves 91, 92 are provided for equalizer 31. Check valve 100 permits flow to brake line 46 when bleeding the brakes, and prevents reverse flow when cap 80 is removed.

In the modification shown in Fig. 4, instead of incorporating the equalizer feature in a casting like 1 which houses the two main cylinders, use may be made of a pair of conventional master cylinders, one of which is shown at 81, the equalizer 82 in this case being a separate unit which is connected to the master cylinder 81 by a pipe 83 and to the similar master cylinder not shown by another pipe like 83. The two pipes like 83 serve the purpose of the two passages like 32 and 33 in Figs. 1 and 2. The equalizer 82 comprises a casing 84 which has a cylinder like 30 and a floating piston like 31, below the fluid level 93.

As the equalizer 82 is operated by the pressure developed by the main pistons like 85 when the brakes are applied, the equalizer 82 may be fed with pressure from the brake lines like 86 by way of pipes like 87, instead of having a pipe connection 83 to the main cylinder. Either one or the other may be used by opening one of the valves 88 or 89 and closing the other. The equalizer 82 may have an alarm 89 like that indicated at 42 to 44 in Fig. 1, to operate a lamp 90 or other signal as above described.

The modification in Fig. 4 illustrates that the equalizer feature by itself may be used, without using the check valve 51 of Fig. 1 and its operating mechanism, whereby use may be made of a pair of conventional master cylinders, one of which is indicated at 81.

If desired, the alarm feature may be omitted as the safety feature would still be present for the reason that if one brake line should fail, the other one would be operative. Also even if the alarm feature were omitted, the floating piston 31 would serve a useful purpose during normal operation with both sets of brakes operative for the reason that piston 31 would equalize the pressure on the two sets of brakes.

The automatic shut off feature can be used for a master cylinder which supplies both sets of brakes.

A filler cap not shown is provided above partition 12 for both wells 10 and 11.

Various other modifications may be made in the invention without departing from the spirit of the following claims.

I claim:

1. A hydraulic brake comprising a pair of master cylinders, each having a connection for a brake line, auxiliary cylinder above said master cylinders, said auxiliary cylinder having its top positioned level with a dangerous low fluid level mark, said auxiliary cylinder having a floating piston therein, a passage for admitting fluid pressure developed in one of said master cylinders to one side of said floating piston, a passage for admitting fluid pressure developed by the other master cylinder to the other side of said floating piston, and spring means urging said floating piston to an intermediate position in said auxiliary cylinder.

2. A hydraulic brake according to claim 1 comprising a main piston for each of said master cylinders and means operated by the brake pedal for similarly operating said main pistons.

3. A hydraulic brake according to claim 1 comprising an alarm passage closed by said floating piston when in intermediate position, said auxiliary piston being elongated to prevent opening said alarm passage when equalizing the pressures in said brake lines with one of said brake lines taking a larger volume of brake fluid than the other, said floating piston being movable in opposite directions to open said alarm passage on failure of either of said brake lines, and a fluid pressure operated alarm device connected to said alarm passage.

4. In a hydraulic brake having a master cylinder having a main piston and also having a brake line connection, a sliding piston with a check valve, and an enlarged piston with a stem between said main piston and said connection, said valve closing in the direction of flow from said piston to said connection, means for supplying fluid pressure to said enlarged piston for actuating said valve with said stem to open position when fluid pressure is developed by said main piston, and means weaker than said fluid enlarged piston for urging said valve to closed position.

5. In a hydraulic brake having a master cylinder having a main piston and also having a brake line connection, a sliding piston with a check valve therein between said main piston and said connection, said valve closing in the direction of flow from said main piston to said connection, a spring urging said valve to closed position, an enlarged piston having a stem for opening said valve, a weak spring urging said enlarged piston and said stem to operative position, and a passage for admitting the brake line fluid pressure to said enlarged piston to supplement said stem spring and overcome said valve spring for normal fluid pressure in said brake line when the brakes are applied.

6. A hydraulic brake comprising a casing having an elongated bore, the inner end of which comprises a master cylinder, a screw plug in said bore at the outer end of said master cylinder, said bore having an enlarged cylinder at the outer end portion of said bore, and a cap closing the outer end of said bore, a main piston at the inner end of said master cylinder, a floating piston at an intermediate portion of said master cylinder, opposed springs acting on said floating piston, a reciprocating valve in said floating piston, said valve closing in the direction of outward flow from said master cylinder, spring means tending to close said valve, a piston in said enlarged cylinder, said plug having a bore, a stem on said last mentioned piston extending through said bore in position to open said valve at certain times, a spring urging said last mentioned piston and its stem inwardly of said master cylinder, said last mentioned spring being weaker than said valve spring, and a brake connection having passages leading to said enlarged cylinder and to said master cylinder between said floating piston and said plug.

DAVID R. HERRIOTT.

REFERENCES CITED

The following references are of record in the file of this patent:

UNITED STATES PATENTS

| Number | Name | Date |
|---|---|---|
| 697,140 | Goldschmidt | Apr. 8, 1902 |
| 1,721,213 | Frock | July 16, 1929 |
| 1,941,563 | Loweke | Jan. 2, 1934 |
| 2,008,975 | Boughton | July 23, 1935 |
| 2,080,687 | Bowen | May 18, 1937 |
| 2,345,811 | Harp | Apr. 4, 1944 |
| 2,353,304 | Green | July 11, 1944 |

FOREIGN PATENTS

| Number | Country | Date |
|---|---|---|
| 331,700 | Great Britain | July 10, 1930 |